US008914459B2

(12) United States Patent
Hanes

(10) Patent No.: US 8,914,459 B2
(45) Date of Patent: Dec. 16, 2014

(54) REDIRECTING I/O REQUEST TO REMOTE NETWORKED PERIPHERAL DEVICE

(75) Inventor: David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2326 days.

(21) Appl. No.: 10/824,242

(22) Filed: Apr. 14, 2004

(65) Prior Publication Data
US 2005/0251561 A1 Nov. 10, 2005

(51) Int. Cl.
G06F 15/16 (2006.01)
H04L 29/12 (2006.01)
G06F 3/06 (2006.01)
H04L 29/08 (2006.01)

(52) U.S. Cl.
CPC ............ *G06F 3/0664* (2013.01); *H04L 61/106* (2013.01); *G06F 3/0635* (2013.01); *G06F 3/067* (2013.01); *G06F 3/0674* (2013.01); *H04L 29/12009* (2013.01); *G06F 3/0607* (2013.01); *H04L 67/1097* (2013.01)
USPC .......................................... 709/217; 709/245

(58) Field of Classification Search
CPC ..... G06F 3/0635; G06F 3/067; G06F 3/0674; H04L 61/106; H04L 67/1097
USPC ................. 709/217–219, 230–238, 250, 245; 710/305, 313
See application file for complete search history.

(56) References Cited

U.S. PATENT DOCUMENTS

| 4,370,708 | A | * | 1/1983 | Bruce et al. ...................... 703/25 |
| 5,987,541 | A | * | 11/1999 | Hewitt ............................ 710/65 |
| 5,991,813 | A | | 11/1999 | Zarrow |
| 5,996,024 | A | | 11/1999 | Blumenau |
| 6,157,950 | A | | 12/2000 | Krishnan |
| 6,173,374 | B1 | * | 1/2001 | Heil et al. ...................... 711/148 |
| 6,370,592 | B1 | * | 4/2002 | Kumpf .......................... 719/328 |
| 6,535,937 | B1 | * | 3/2003 | Beardsley et al. ............ 710/100 |
| 6,658,459 | B1 | | 12/2003 | Kwan et al. |
| 6,684,281 | B1 | * | 1/2004 | Sugahara et al. ............. 710/260 |
| 6,829,652 | B1 | * | 12/2004 | Wunderlich ................... 709/245 |
| 6,874,046 | B1 | * | 3/2005 | LeCrone et al. ................ 710/74 |
| 6,901,451 | B1 | * | 5/2005 | Miyoshi et al. ............... 709/232 |
| 6,927,974 | B2 | * | 8/2005 | Robillard et al. ............. 361/686 |
| 6,928,508 | B2 | * | 8/2005 | Tse ................................ 710/313 |
| 6,957,219 | B1 | * | 10/2005 | Lin et al. ......................... 707/10 |
| 7,171,464 | B1 | * | 1/2007 | Raghuraman et al. ........ 709/224 |

(Continued)

FOREIGN PATENT DOCUMENTS

EP 1357476 A2 10/2003
JP 2000-207138 A 7/2000

(Continued)

OTHER PUBLICATIONS

European Search Report for European Patent Application No. EP 05 00 5620 dated Sep. 24, 2008 (2 pages).

*Primary Examiner* — Aaron Strange

(74) *Attorney, Agent, or Firm* — James L. Baudino

(57) ABSTRACT

An input/output (I/O) request processing system comprises a drive command module adapted to receive an I/O request referencing a local peripheral address for processing of the I/O request. The system also comprises a redirector communicatively coupled to the drive command module. The redirector is adapted to automatically convey the I/O request over a communication network to a remote peripheral device for processing of the I/O request.

43 Claims, 3 Drawing Sheets

(56) References Cited

U.S. PATENT DOCUMENTS

| | | | |
|---|---|---|---|
| 7,231,397 B2 * | 6/2007 | Madhavarapu et al. | 707/101 |
| 7,423,998 B2 * | 9/2008 | Kim | 370/338 |
| 2002/0141418 A1 * | 10/2002 | Ben-Dor et al. | 370/398 |
| 2002/0178238 A1 * | 11/2002 | Fletcher et al. | 709/220 |
| 2003/0028731 A1 | 2/2003 | Spiers et al. | |
| 2003/0154314 A1 * | 8/2003 | Mason et al. | 709/250 |
| 2005/0102370 A1 * | 5/2005 | Lin et al. | 709/217 |
| 2005/0251561 A1 | 11/2005 | Hanes | |

FOREIGN PATENT DOCUMENTS

| | | |
|---|---|---|
| JP | 2002-099495 A | 4/2002 |
| JP | 2002-530728 A | 9/2002 |
| JP | 2003-531416 A | 10/2003 |
| WO | 0239317 A1 | 5/2002 |
| WO | WO-02/054266 A1 | 7/2002 |

\* cited by examiner

REDIRECTING I/O REQUEST TO REMOTE NETWORKED PERIPHERAL DEVICE

TECHNICAL FIELD

This invention relates to network technologies and, more particularly, to a computer-readable medium, method, and system for accessing a networked peripheral device.

BACKGROUND

Computer systems generally comprise a storage management file system to enable a user to store and retrieve information. For example, a file system generally enables a user to create, modify and delete files; identify stored files by a symbolic name rather than specifying a physical storage device name; and view the information logically rather than with a more detailed physical view. The file system generally manages information via a device driver which manages a storage abstraction of a storage device. For example, based on a file system layout on the storage device, the device driver manages storage and retrieval of information using file system metadata information.

Network file sharing is a method for transferring information over a physical network medium via a transport protocol. A transport protocol generally comprises a network file sharing protocol that enables remote operations such as opening, creating, reading, writing, and closing data files. In operation, a file sharing server generally runs on top of an existing file system such that network file sharing requests or calls are passed from the file sharing server to the file system. Because file systems generally comprise the same set of functions (i.e., open, read, create, write, etc.), a network sharing server can run on top of virtually any file system. Thus, in operation, based on the file system layout of a local storage device, the file system enables remote data management operations by responding to network file sharing calls received from a network sharing server.

However, various types of storage mediums and associated devices, especially peripheral devices such as compact disc (CD) recorders, digital versatile disk (DVD) recorders, and other types of peripheral device recording systems, do not readily accommodate writing or recording data across a network. For example, blank CDs and DVDs generally do not have a file system layout recorded thereon. In operation, recording information to blank CDs and DVDs generally comprises "pre-mastering" such that the content to be stored on the blank medium is known ahead of time. Thus, there is no format operation performed on the medium and no file system metadata recorded onto the medium. A software application for writing information to a medium such as a blank CD or DVD generally creates an image of the content that will be stored on the blank medium block-by-block and communicates directly with a disk driver to issue commands to write the content to the medium in this sequence of blocks, thereby bypassing any file system. Thus, because the file system is bypassed, a network file sharing infrastructure does not enable remote data management.

SUMMARY

In accordance with an embodiment of the present invention, an input/output (I/O) request processing system comprises a drive command module adapted to receive an I/O request referencing a local peripheral address for processing of the I/O request. The system also comprises a redirector communicatively coupled to the drive command module. The redirector is adapted to automatically convey the I/O request over a communication network to a remote peripheral device for processing of the I/O request.

In accordance with another embodiment of the present invention, a method for input/output (I/O) request processing comprises receiving an I/O request referencing a local peripheral address for processing of the I/O request. The method also comprises automatically invoking a redirector adapted to convey the I/O request to a communication network to enable processing of the I/O request by a remote peripheral device.

In accordance with another embodiment of the present invention, an input/output (I/O) request processing system comprises a drive command module adapted to receive a command to record data to an optical medium. The system also comprises a redirector communicatively coupled to the drive command module. The redirector is adapted to receive the drive command from the drive command module and automatically format the command for processing by a remote optical drive.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
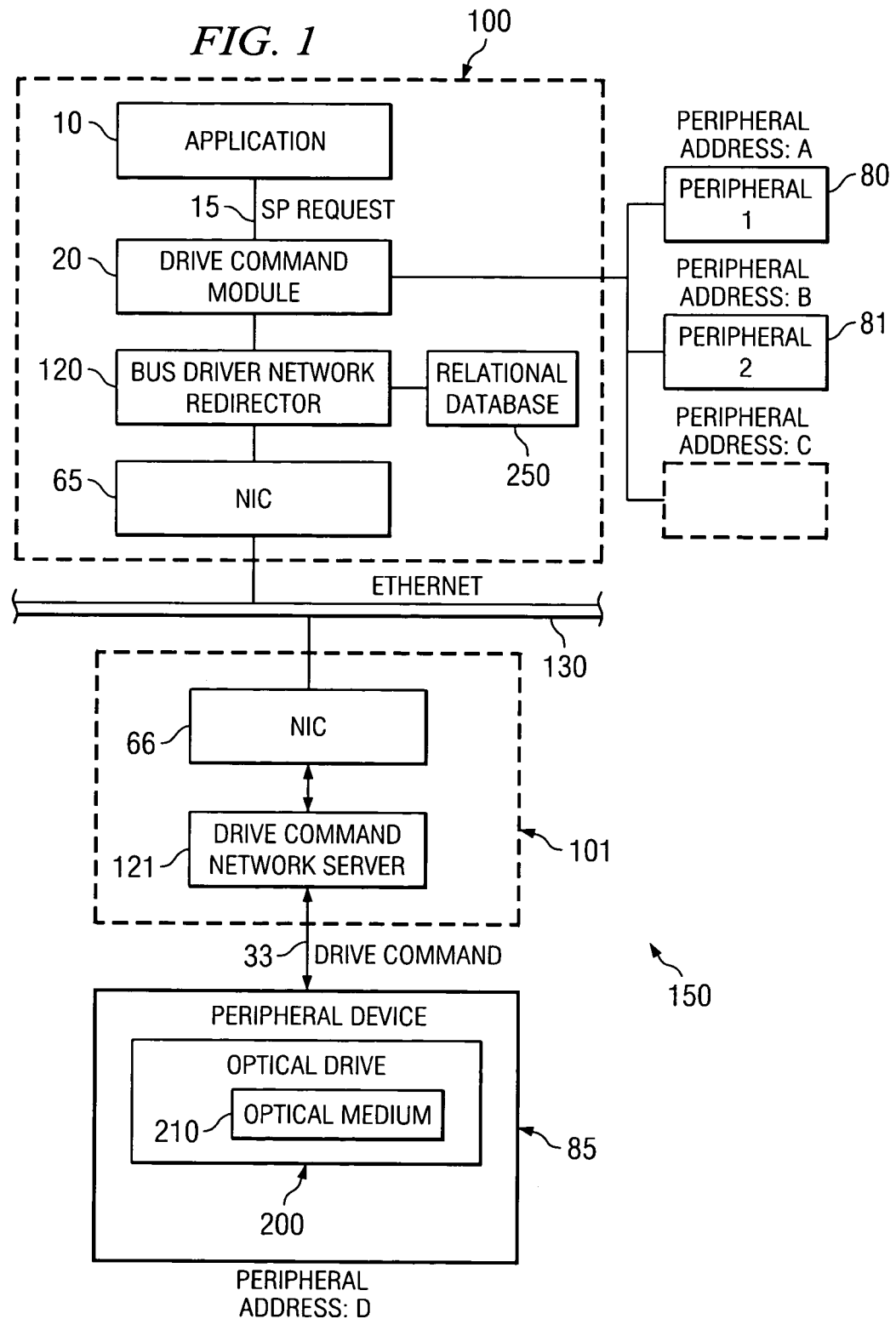
FIG. 1 is a block diagram of an example of various software and hardware modules for enabling processing of an input/output request issued by client application according to embodiments of the invention.

The preferred embodiment of the present invention and its advantages are best understood by referring to FIGS. 1 through 4 of the drawings, like numerals being used for like and corresponding parts of the various drawings.

For a peripheral device, e.g., an optical disc drive, it is desirable to enable client applications executing on various host devices to share access to the peripheral device over a network. It is further desirable to have the capability to communicate with the peripheral device over the network as if it is a local device.

Many software applications communicate with a peripheral device of a computer system. To facilitate such communications, a device driver is used to control a hardware component of a peripheral device. A device driver is generally responsible for accessing one or more hardware register(s) of the peripheral device and may include an interrupt handler to process hardware interrupts generated by the peripheral device. Application programs often use a software layer commonly referred to as an application programming interface (API) for interfacing with a peripheral device and for managing appropriate device driver calls. For example, the small computer system interface (SCSI) pass-through interface (SPTI) API, is implemented as a low-level portion of an operating system (O/S) kernel. Alternatively, the advanced SCSI peripheral interface (ASPI) API, is implemented as (a) file(s) loaded during application run-time. Other applications may communicate with a peripheral device by a proprietary device driver.

An input/output (I/O) request issued by a client application and directed to a peripheral device is ultimately processed by a device driver adapted to format the I/O request for delivery to the targeted peripheral device regardless of whether the device driver is implemented as a proprietary device driver or an API. In doing so, a bus driver, e.g., an integrated device electronics (IDE) bus driver, a SCSI bus driver, or the like, that communicatively interfaces with the peripheral device is invoked. An I/O request identifies a particular peripheral device by way of one or more peripheral identifiers or attributes included within or referenced by the I/O request. As referred to herein, a software layer that receives an I/O request, and processes the request for execution with a targeted peripheral device, is referred to as a drive command module (DCM). A DCM may comprise part of an operating system or, alternatively, may be implemented as run-time software modules. In general, a DCM receives an I/O request and identifies an appropriate bus driver by way of a local peripheral device address associated with the targeted peripheral device. Assignment of a local peripheral device address with the I/O request may be had by including the address within the I/O request, or referencing, e.g., by a pointer, the peripheral device address within the I/O request. A DCM is adapted to process an I/O request issued by a client application, and execute one or more drive commands with the peripheral device targeted by the I/O request. A drive command issued by a DCM corresponds to a received I/O request and is a lower-level, machine processible representation of the I/O request. Embodiments of the present invention enable I/O requests issued by a client application to be processed with a remotely located peripheral device in a manner that is transparent to the client application.

Embodiments of the present invention may be better understood with reference to FIG. 1 illustrating a block diagram of various software and hardware modules for enabling the remote processing of an I/O request 15 issued by a client application 10. A system 150 comprises a host device 100, e.g., a computer system and a network-connected device 101. Client application 10 executes on host device 100. In the illustrative example, the descriptions of system 150 will be made with reference to a DCM 20 implemented as an SPTI. Accordingly, formatting of an I/O request 15 issued by client application 10 is described with reference to the SPTI protocol. Processing of an I/O request by an application that interfaces with another implementation of a DCM, e.g., ASPI, WINDOWS32 API, etc., may be performed in a similar manner in accordance with embodiments of the invention, and may be implemented for any drive command module now known or later developed.

According to one embodiment of the present invention, application 10 generates and issues I/O request 15 comprising a local peripheral address and conveys I/O request 15 to DCM 20. As referred to herein, a local peripheral address is a peripheral address associated with an originator of I/O request 15. In the illustrative example, I/O request 15 is issued by client application 10 running on device 100, and device 100 comprises the I/O request originator device. A call to a bus driver, e.g., a SCSI bus driver, is made by DCM 20 in an attempt to convey I/O request 15 to a local adapter in accordance with the local peripheral address of I/O request 15. In the illustrative example, device 100 comprises two peripheral devices 80 and 81 having respective peripheral addresses A and B. For illustrative purposes, assume I/O request 15 includes or references a local peripheral address C of host device 100 at which no peripheral device is located. The absence of a peripheral device at peripheral address C is illustratively designated with dashed lines. The absence of a peripheral device at peripheral address C may, for example, be realized as an empty host adapter slot within device 100.

In accordance with an embodiment of the invention, a bus driver network redirector 120, rather than a conventional bus driver, is invoked by a bus driver call made by DCM 20. Redirector 120 may, for example, be identified by DCM 20 as a bus driver by assignment of a bus driver label, e.g., a bus driver file name, to redirector 120. Other implementations for invoking redirector 120 by a bus driver call made by DCM 20 are possible. Network redirector 120 supplies the drive command to a network interface card (NIC) 65 that interfaces with a network medium 130, e.g., a 100baseT Ethernet cable. Network medium 130 is coupled with remote device 101 that is, in turn, communicatively coupled with a peripheral device 85. Peripheral device 85 has a peripheral address D associated therewith. Device 101, or the receiver device, receives and processes I/O request 15, and issues a corresponding drive command 33 to device 85. In an exemplary embodiment, a drive command network server 121 receives I/O request 15 from a network interface card (NIC) 66 and identifies peripheral device 85 for execution of I/O request 15 therewith. Any return data or error/status information generated by execution of I/O request 15 by peripheral device 85 is preferably transmitted over network medium 130 and conveyed to application 10. Thus, embodiments of the invention enable I/O request 15 having, or referencing, a local peripheral address issued by an originator device 100 to be redirected to a remotely located device 101. The remote device 101 is coupled to peripheral device 85 having a peripheral address D associated with remote device 101. Execution or processing of I/O request 15 is then performed by peripheral device 85.

Figure 2:
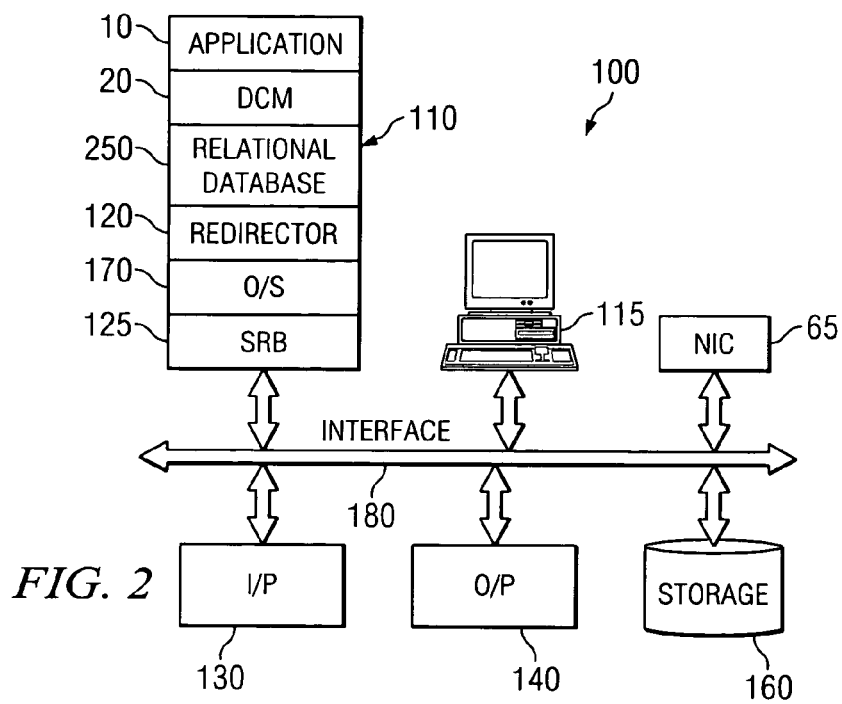
FIG. 2 is a block diagram of a device that may run a client application for issuing input/output requests implemented according to embodiments of the invention.

FIG. 2 is a block diagram of device 100 as may be implemented according to embodiments of the invention. Device 100 stores client application 10 in a memory device 110. Through conventional techniques, client application 10 is executed by an operating system (O/S) 170 and one or more processing elements 115, such as a central processing unit (CPU). Operating system 170 controls the resources of device 100 and interfaces the instructions of application 10 with processing element 115.

Processing element 115 communicates with and drives the other elements within device 100 via a local interface 180, which may comprise one or more busses. Furthermore, an input device 130, for example a keyboard or a pointer device, can be used to input data from a user of device 100, and an output device 140, for example a display device or a printer, can be used to output data to the user. A disk storage device 160, such as a magnetic disk, is connected to local interface 180 for data transfers therewith. NIC 65, such as an Ethernet card, is interconnected with interface 180 and provides a physical connection to network medium 130.

Drive command module 20 is stored in memory device 110 or storage device 160 and is invoked by application 10 for processing of I/O request 15. Redirector 120 is invoked by DCM 20 and formats I/O request 15 for delivery over network medium 130. For example, redirector 120 may encapsulate I/O request 15 into one or more Ethernet packets addressed to remote device 101. The network formatted I/O request 15 is conveyed to a network driver, e.g., an Ethernet driver, supplied to NIC 65, and transmitted to network-connected remote device 101 by way of network medium 130.

Figure 3:
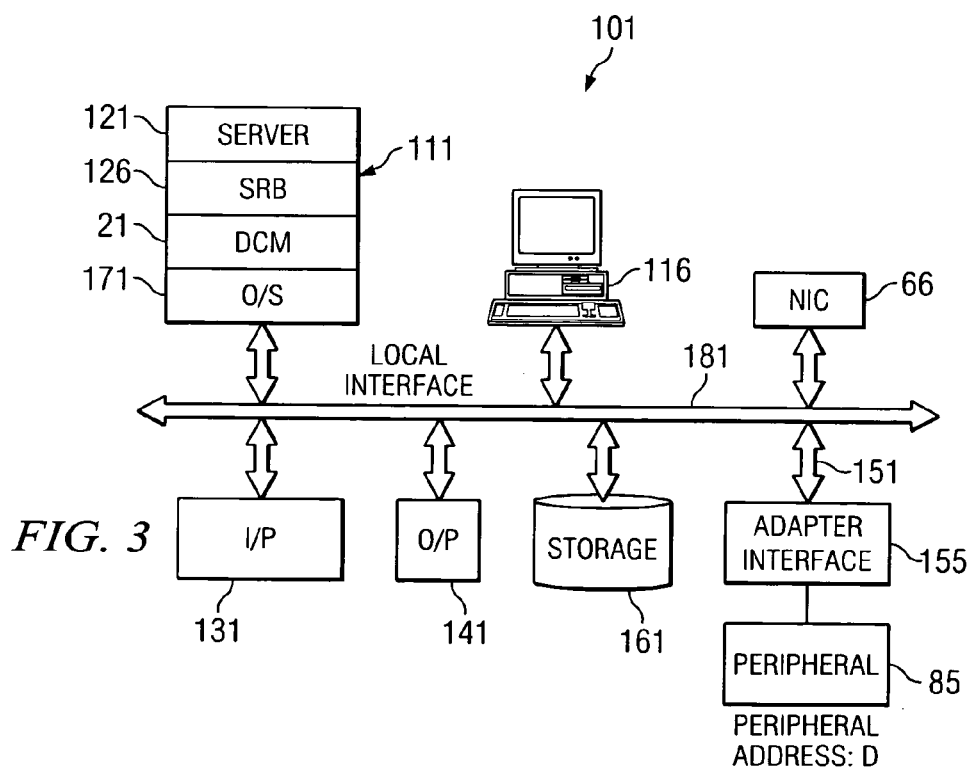
FIG. 3 is a block diagram of an example of a device interconnected with a peripheral device for processing input/output requests implemented according to embodiments of the invention.

FIG. 3 is a simplified block diagram of device 101 as may be implemented according to embodiments of the invention.

Device 101 stores network server 121 in a memory device 111. Server 121 is executed by an O/S 171 and one or more processing elements 116 to facilitate proper operation of server 121. Operating system 171 interfaces the instructions of server 121 with processing element 116 as necessary to enable server 121 to properly run. Processing element 116 communicates with and drives the other elements within device 101 via a local interface 181. Device 101 may comprise an input device 131, an output device 141, a storage device 161 or other subsystems. A NIC 66 included within device 101 provides a physical connection with network medium 130.

An adapter interface 155, for example a peripheral component interconnect, an IDE interface, a SCSI, or another suitable peripheral interface, is communicatively coupled with processing element 116 by one or more busses 151, e.g., a PCI bus. Adapter interface 155 may be implemented as a socket, or expansion slot, and associated circuitry disposed on a backplane, e.g., a motherboard, of device 101 and provides a communication coupling or interconnection between peripheral device 85 and processing element 116. Memory device 111 or storage device 161 stores network server 121 implemented as one or more computer-readable instruction set(s) executable by processing element 116. Additionally, a DCM 21 is stored in memory device 111 or storage device 161.

Thus, for example, referring to FIGS. 1-3, according to one embodiment of the present invention, peripheral device 85 comprises an optical drive 200 for recording, reading, or otherwise processing data associated with an optical medium 210 accessible by optical drive 200. In the illustrated embodiment, application 10 comprises software for accessing, reading, recording or otherwise processing data via a communicatively coupled optical drive. Thus, in operation, embodiments of the present invention enable an I/O request 15 issued from application 10, such as but not limited to, a record command, to be processed or otherwise executed by optical drive 200.

Figure 4:
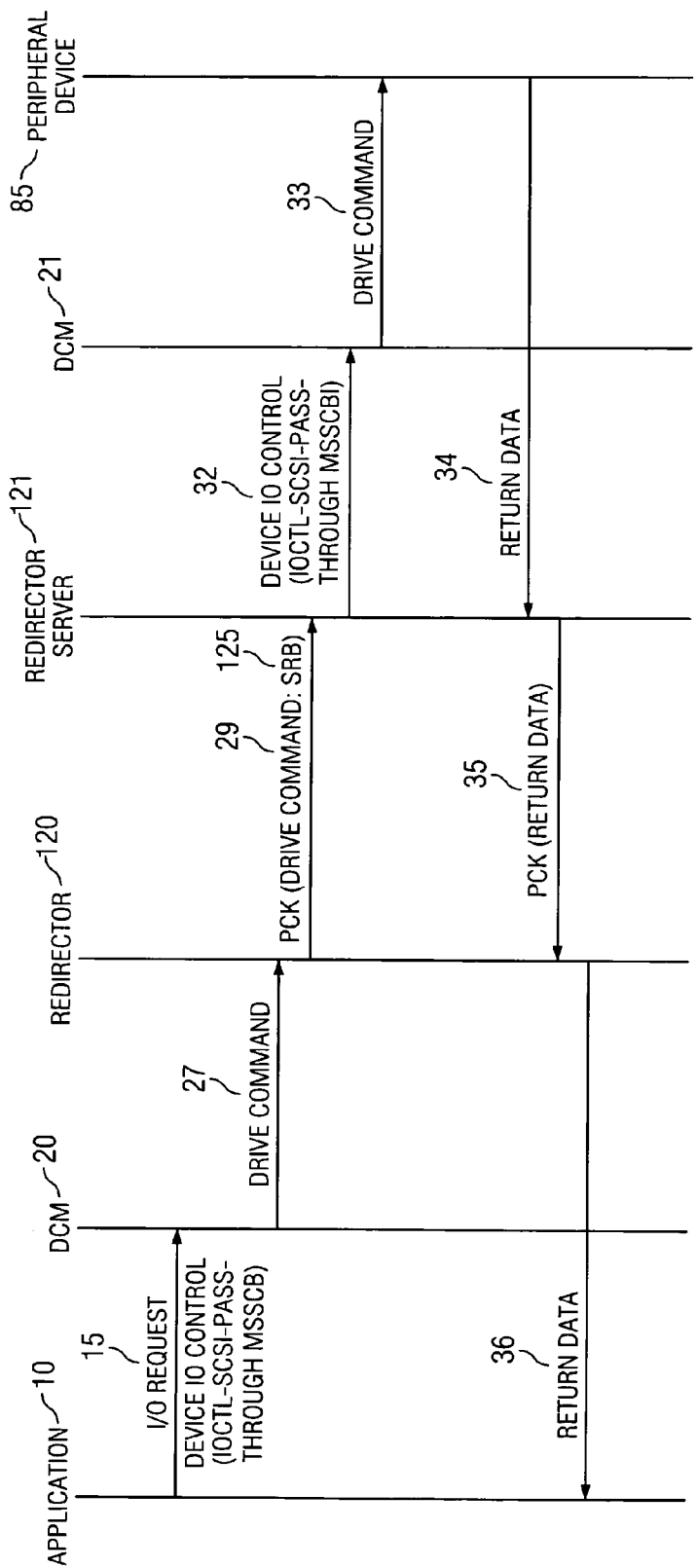
FIG. 4 is a message flow diagram illustrating an example of processing of an input/output request in accordance with embodiments of the invention.

With reference to FIG. 4, a message flow diagram illustrates the processing of an I/O request in accordance with embodiments of the invention. Application 10 issues I/O request 15 formatted in accordance with drive command module 20. In the illustrative example, drive command module 20 is implemented as an SPTI and the illustrative I/O request 15 comprises an SPTI-formatted DeviceIOControl function call. A DeviceIOControl I/O request is an SPTI-formatted function call for sending a control code to a specified device driver that causes a corresponding device to perform an operation specified by the I/O request. In general, an SPTI-formatted I/O request comprises one or more control codes as function arguments of the I/O request. The control code defines the particular request-type of an SPTI-formatted I/O request. In the illustrative example, a control code IOCTL_SCSI_PASS_THROUGH is included in I/O request 15 and defines I/O request 15 as a buffered I/O request. Additionally, I/O request 15 comprises a pointer to a SCSI request block (SRB) that is used in conjunction with function call DeviceIOControl for fully defining the particular I/O request. In general, an SRB comprises a data structure for issuing commands to a peripheral device. Particularly, an SRB comprises members, or fields, that respectively comprise a value defining a parameter or characteristic of the I/O request for proper execution of the input/output request. A particular peripheral device with which I/O request 15 is to be directed is identified by one or more SRB members and may include one or more of a host adapter identifier, a target identifier, a logical unit number, or another SRB member that defines a local peripheral address that facilitates execution of I/O request 15 with a targeted local peripheral device. For illustrative purposes, assume an SRB 125 stored in memory device 110 is referenced by a pointer and comprises one or more fields that address I/O request 15 to peripheral address C.

In accordance with embodiments of the invention, a local peripheral address included (or otherwise referenced) in I/O request 15 constitutes a peripheral address at which no peripheral device exists. I/O request 15 is received by DCM 20, e.g., a SPTI, and one or more drive commands 27 corresponding thereto are generated by DCM 20. DCM 20 attempts invocation of a bus driver associated with the local peripheral address C of I/O request 15. In response to a bus driver call made by DCM 20, redirector 120 is invoked and DCM 20 passes drive command 27 thereto. Redirector 120 formats drive command 27 for delivery over network medium 130. In the illustrative example, drive command 27 is encapsulated into one or more packets (PCK). Preferably, SRB 125 referenced by a pointer is encapsulated with drive command 27. In general, redirector 120 comprises logic for addressing a network-formatted drive command 29 (PCK(Drive command, SRB)) for delivery to remote device 101. For example, a network address assigned to device 101 may be inserted into a header of network-formatted drive command 29. Additionally, a port assigned to network server 121 may be inserted into a header of network-formatted drive command 129. In general, network-formatted drive command 29 is conditioned for network delivery to network server 121 and is supplied to network medium 130 by redirector 120.

Network-formatted drive command 29 is conveyed to network server 121 upon receipt by device 101. In general, network server 121 is adapted to direct execution of an input/output request defined by network-formatted drive command 29 with a peripheral device interconnected with device 101. In an exemplary embodiment, network server 121 comprises logic for removing one or more SRB element or field values defining the local peripheral address to which I/O request 15 was originally directed. Preferably, network server 121 comprises logic for removing a peripheral address from network-formatted drive command 29 and inserting a peripheral address assigned to peripheral device 85. For example, a host adapter identifier, a target identifier, and logical unit number members specifying peripheral device address C included within the SRB 125 conveyed to redirector sever 121 are respectively removed from the SRB structure and a host adapter identifier, a target identifier, and logical unit number members specifying peripheral address D of peripheral device 85 are inserted therefor. However, it should also be understood that redirector 120 may be configured to remove a peripheral address from network-formatted drive command 29 and insert a peripheral address assigned to peripheral device 85. A modified SRB 126 data structure having the address of peripheral device 85 is written to memory device 111 by network server 121. In the illustrative example, network server 121 additionally generates a drive command module I/O request 32 corresponding to drive command 29. DCM I/O request 32 comprises a DeviceIOControl function call corresponding to the function call in I/O request 15 and a pointer $mssrb_1$ that references the modified SRB 126 written to memory device 111. Network server 121 then submits the generated DCM I/O request 32 to a DCM 21, e.g., an SPTI. Execution of DCM I/O request 32 is made according to SRB 126 referenced by pointer $mssrb_1$, that is with peripheral device 85 targeted by the peripheral address inserted into SRB 126. Accordingly, DCM 21 processes I/O request 32 and executes a drive command 33 corresponding thereto with peripheral device 85.

A return data set 34 or error/status information may be conveyed to redirector sever 121 upon execution of drive command 33. In the event that return data is provided by peripheral device 85 upon execution of drive command 33, redirector sever 121 preferably encapsulates return data set 34 into a packet return data set 35 and supplies the return data over network medium 130. Packet return data set 35 is addressed to device 100 and may include addressing data, e.g., a port assigned to redirector 120, for delivery of packet return data set 35 to redirector 120. Upon receipt of the return data set by redirector 120, the return data set is conveyed to application 10. Accordingly, a return data set 36 is processed by application 10 as if the return data had been generated by a peripheral device located at the local peripheral address targeted by I/O request 15. That is, application 10 issues I/O request 15 and processes any return data set 36 as if the I/O request was carried out locally on a peripheral device interconnected with device 100.

As described above, I/O request 15 may be configured to reference or otherwise indicate a remote peripheral address associated with peripheral device 85 (e.g., a field within drive command 27). However, it should also be understood that the identification of the remote address associated with peripheral device 85 may be otherwise determined. For example, referring to FIGS. 1 and 2, device 100 may also comprise a relational database 250 accessible by redirector 120 and/or DCM 20 such that information associated with correlating a local peripheral address (e.g., local peripheral address C) with a remote address of peripheral device 85 may be retrieved or otherwise accessed.

As described, embodiments of the invention enable an application running on a computer or other device interconnected with a network to issue input/output requests directed to a local peripheral device address at which no peripheral device exists. A redirector application receives a drive command corresponding to the input/output request and delivers the drive command to a network-connected remote device having a peripheral device interconnected therewith. An input/output request corresponding to the received drive command is generated by the remote device and a peripheral address associated with the remote device is inserted into the input/output request. Execution of the generated input/output request by the remote device then results in processing of the input/output request with ,the peripheral device. Accordingly, an expensive peripheral device, e.g., a recordable digital versatile disc drive, may be located on a network computer or other device. Any network connected computer having a client application adapted to perform input/output requests with a local peripheral device may then issue input/output requests in a conventional manner without knowledge that the peripheral device is remotely located.

Redirector 120 and drive command network server 121 are preferably implemented as an instruction set(s), or program, of computer-readable logic. The instruction set is preferably maintained on any one of various conventional computer-readable mediums. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium now known.

What is claimed is:

1. A processing system, comprising:
a processor; and
memory storing instructions executable by the processor, the instructions comprising:
a drive command module adapted to receive an I/O request from a client application referencing a local peripheral address of a peripheral device for processing of the I/O request; and
a network redirector communicatively coupled to the drive command module, wherein the redirector is invoked by the drive command module, the redirector adapted to automatically and transparent to the client application convey the I/O request over a communication network to a remote peripheral device for processing of the I/O request, wherein the redirector is adapted to replace the local peripheral address of the I/O request with an address associated with the remote peripheral device.

2. The system of claim 1, wherein the redirector is adapted to correlate the local peripheral address with an address of the remote peripheral device.

3. The system of claim 1, wherein the drive command module is adapted to call a bus driver associated with the local peripheral address to invoke the redirector.

4. The system of claim 1, further comprising a network server adapted to receive the I/O request from the communication network and execute a command to process the I/O request via the remote peripheral device.

5. The system of claim 1, wherein the I/O request comprises a field identifying the local peripheral address.

6. The system of claim 1, further comprising a relational database having information associated with correlating the local peripheral address to an address of the remote peripheral device.

7. The system of claim 1, wherein the redirector is adapted to format a drive command issued by the drive command module for delivery over the communication network to the remote peripheral device.

8. The system of claim 7, wherein the redirector is adapted to insert an address associated with the remote peripheral device into the drive command.

9. The system of claim 1, further comprising a network server adapted to receive the I/O request from the communication network and extract an address associated with the remote peripheral device.

10. The system of claim 1, the local peripheral address corresponding to a local peripheral address of a host device of the drive command module.

11. The system of claim 10, the redirector disposed on the host device.

12. A method for input/output (I/O) request processing, comprising:
receiving an I/O request from a client application referencing a local peripheral address of a peripheral device for processing of the I/O request;
automatically and transparent to the client application invoking a network redirector adapted to convey the I/O request to a communication network to enable processing of the I/O request by a remote peripheral device; and
replacing the local peripheral address of the I/O request with an address associated with the remote peripheral device.

13. The method of claim 12, further comprising correlating the local peripheral address with an address of the remote peripheral device.

14. The method of claim 12, further comprising replacing the local peripheral address of the I/O request with an address associated with the remote peripheral device.

15. The method of claim 12, further comprising calling a bus driver associated with the local peripheral address to invoke the redirector.

16. The method of claim 12, further comprising replacing the local peripheral address of the I/O request with an address associated with the remote peripheral device.

17. The method of claim 12, further comprising extracting an address associated with the remote peripheral device from a field of the I/O request.

18. The method of claim 12, further comprising accessing a relational database having information associated with correlating the local peripheral address to an address of the remote peripheral device.

19. The method of claim 12, further comprising formatting a drive command associated with the I/O request for delivery over the communication network to the remote peripheral device.

20. The method of claim 19, further comprising inserting an address associated with the remote peripheral device into the drive command.

21. The method of claim 12, wherein receiving an I/O request comprises receiving an I/O request of a host device referencing the local peripheral address of the host device.

22. The method of claim 21, wherein automatically invoking comprises automatically invoking a redirector disposed on the host device.

23. A processing system, comprising:
a processor; and
memory storing instructions executable by the processor, the instructions comprising:
a drive command module adapted to receive a command from a client application to record data to an optical medium; and
a network redirector communicatively coupled to the drive command module, wherein the redirector is invoked by the drive command module, the redirector adapted to receive the drive command from the drive command module and automatically and transparent to the client application format the command for processing by a remote optical drive, wherein the redirector is adapted to automatically replace a local peripheral address associated with the drive command with an address associated with the remote optical drive.

24. The system of claim 23, wherein the drive command references a local peripheral address.

25. The system of claim 23, wherein the redirector is adapted to correlate a local peripheral address associated with the drive command with an address of the remote optical drive.

26. The system of claim 23, further comprising a relational database having information associated with correlating the drive command to an address of the remote optical drive.

27. The system of claim 23, wherein the drive command comprises a field referencing an address associated with the remote optical drive.

28. The system of claim 23, wherein the redirector is adapted to extract from the drive command an address associated with the remote optical drive.

29. The system of claim 23, wherein the drive command references the local peripheral address of a host device of the drive command module.

30. The system of claim 29, the redirector disposed on the host device.

31. A processing system, comprising:
a processor; and
memory storing instructions executable by the processor, the instructions comprising:
means for receiving an I/O request from a client application referencing a local peripheral address of a peripheral device for processing of the I/O request;
means, communicatively coupled to the receiving means, for automatically conveying the I/O request over a communication network to a remote peripheral device; and
means for inserting an address associated with the remote peripheral device into a drive command issued by the receiving means.

32. The system of claim 31, further comprising means for correlating the local peripheral address with an address associated with the remote peripheral device.

33. The system of claim 31, further comprising means for extracting an address associated with the remote peripheral device from a drive command issued by the receiving means.

34. The system of claim 31, further comprising means for formatting a drive command issued by the receiving means for delivery over the communications network to the remote peripheral device.

35. An input/output (I/O) request processing method, comprising:
receiving a drive command from a client application at a host device to record data to an optical medium;
automatically and transparent to the client application formatting the drive command for processing by a remote optical drive; and
automatically replacing a local peripheral address associated with the drive command with an address associated with the remote optical drive.

36. The method of claim 35, further comprising automatically correlating a local peripheral address associated with the drive command with an address of the remote optical drive.

37. The method of claim 35, further comprising extracting from a field of the drive command an address associated with the remote optical drive.

38. The method of claim 35, wherein receiving a drive command comprises receiving a drive command issued by the host device.

39. A non-transitory computer readable medium having stored thereon an instruction set to be executed, the instruction set, when executed by a processor, causes the processor to:
receive an input/output (I/O) request from a client application referencing a local peripheral address of a peripheral device for processing of the I/O request; and
automatically and transparent to the client application convey the I/O request over a communication network to a remote peripheral device for processing of the I/O request, wherein the instruction set, when executed by a processor, causes the processor to replace the local peripheral address with an address associated with the remote peripheral device.

40. The non-transitory computer-readable medium according to claim 39, wherein the instruction set, when executed by a processor, causes the processor to automatically extract an address associated with the remote peripheral device from a drive command associated with the I/O request.

41. The non-transitory computer-readable medium according to claim 39, wherein the instruction set, when executed by a processor, causes the processor to automatically correlate the local peripheral address with an address associated with the remote peripheral device.

42. The non-transitory computer-readable medium according to claim 39, wherein the instruction set, when executed by a processor, causes the processor to format a drive command associated with the I/O request for delivery over the communication network to the remote peripheral device.

43. The non-transitory computer-readable medium according to claim 39, wherein the instruction set, when executed by a processor, causes the processor to receive the I/O request from a host device referencing the local peripheral address of the host device.

* * * * *